(12) United States Patent
Sasagawa

(10) Patent No.: US 11,845,212 B2
(45) Date of Patent: Dec. 19, 2023

(54) INJECTION MOLDING APPARATUS, COOLING PLATE FOR INJECTION MOLDING APPARATUS, AND CASSETTE MOLD

(71) Applicant: SEIKO EPSON CORPORATION, Tokyo (JP)

(72) Inventor: Kakeru Sasagawa, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 26 days.

(21) Appl. No.: 17/160,637

(22) Filed: Jan. 28, 2021

(65) Prior Publication Data

US 2021/0229333 A1    Jul. 29, 2021

(30) Foreign Application Priority Data

Jan. 28, 2020    (JP) ................................ 2020-011418

(51) Int. Cl.

| | |
|---|---|
| *B29C 45/73* | (2006.01) |
| *B29C 45/03* | (2006.01) |
| *B29C 45/17* | (2006.01) |
| *B29C 45/26* | (2006.01) |
| *B29C 45/76* | (2006.01) |

(52) U.S. Cl.
CPC .............. *B29C 45/73* (2013.01); *B29C 45/03* (2013.01); *B29C 45/1774* (2013.01); *B29C 45/2673* (2013.01); *B29C 45/76* (2013.01); *B29C 2945/76806* (2013.01)

(58) Field of Classification Search
CPC .......... B29C 2945/76806; B29C 45/03; B29C 45/1774; B29C 45/2673; B29C 45/73; B29C 45/76; B29C 33/02
See application file for complete search history.

(56) References Cited

U.S. PATENT DOCUMENTS

| | | | |
|---|---|---|---|
| 2012/0053718 A1* | 3/2012 | Grimm | .................. B29C 45/73 |
| | | | 700/103 |
| 2012/0301571 A1 | 11/2012 | Kim et al. | |

(Continued)

FOREIGN PATENT DOCUMENTS

| | | | | |
|---|---|---|---|---|
| JP | 04336217 A | * | 11/1992 | ......... B29C 45/4005 |
| JP | H0671713 A | | 3/1994 | |

(Continued)

OTHER PUBLICATIONS

JPH04336217A—Machine Translation (Year: 1992).*
Office Action for JP Patent Application No. JP2020-011418, dated Oct. 24, 2023, 8 pages of Office Action.

*Primary Examiner* — Yunju Kim
(74) *Attorney, Agent, or Firm* — CHIP LAW GROUP

(57) ABSTRACT

An injection molding apparatus includes: a molding mold including a fixed mold in which a gate into which a molding material flows is formed, and a movable mold in which a cavity portion is formed and which is separated from the fixed mold when the mold is opened; a nozzle in which a flow path that guides the molding material to the gate is formed; and a first cooling plate which is detachably attached to an opposite-side surface of the movable mold from a surface to be in contact with the fixed mold and which is provided with a first cooling mechanism therein, and the first cooling mechanism cools the molding material in the cavity portion.

9 Claims, 8 Drawing Sheets

(56) References Cited

U.S. PATENT DOCUMENTS

| | | | | |
|---|---|---|---|---|
| 2013/0224327 | A1* | 8/2013 | Altonen | B29C 33/02 |
| | | | | 425/552 |
| 2022/0193759 | A1* | 6/2022 | Matsuzawa | B22D 17/22 |

FOREIGN PATENT DOCUMENTS

| | | | |
|---|---|---|---|
| JP | 2012245783 | A | 12/2012 |
| JP | 2015515404 | | 5/2013 |
| JP | 2015512808 | A | 4/2015 |
| JP | 2015520050 | A | 7/2015 |
| WO | 2013126723 | A1 | 8/2013 |
| WO | 2013166272 | A2 | 11/2013 |
| WO | 2013176701 | A1 | 11/2013 |

\* cited by examiner

INJECTION MOLDING APPARATUS, COOLING PLATE FOR INJECTION MOLDING APPARATUS, AND CASSETTE MOLD

The present application is based on, and claims priority from JP Application Serial Number 2020-011418, filed Jan. 28, 2020, the disclosure of which is hereby incorporated by reference herein in its entirety.

BACKGROUND

1. Technical Field

The present disclosure relates to an injection molding apparatus, a cooling plate for injection molding apparatus, and a cassette mold.

2. Related Art

Regarding an injection molding apparatus, JP-A-2012-245783 discloses a cavity mold including a cavity mold plate at a front surface of which a cavity portion is formed, a base on which the cavity mold plate is mounted, and a cooling plate that is disposed between the cavity mold plate and the base and is configured to be in contact with a rear surface of the cavity mold plate.

In a configuration in which a cooling mechanism is provided inside a molding mold as in the cavity mold disclosed in JP-A-2012-245783, a degree of freedom in designing the cavity portion may be limited due to an arrangement of the cooling mechanism. Therefore, when an attempt is made to arrange the cooling mechanism according to a shape of the cavity portion, the cooling mechanism is designed exclusively, and the versatility of the molding mold is reduced.

SUMMARY

A first aspect of the present disclosure provides an injection molding apparatus. The injection molding apparatus includes: a molding mold including a fixed mold in which a gate into which a molding material flows is formed, and a movable mold in which a cavity portion is formed and which is separated from the fixed mold when the mold is opened; a nozzle in which a flow path that guides the molding material to the gate is formed; and a first cooling plate which is detachably attached to an opposite-side surface of the movable mold from a surface to be in contact with the fixed mold and which is provided with a first cooling mechanism therein, and the first cooling mechanism cools the molding material in the cavity portion.

A second aspect of the present disclosure provides a cooling plate for injection molding apparatus, and the injection molding apparatus includes: a fixed mold in which a gate into which a molding material flows is formed, and a movable mold in which a cavity portion is formed and which is separated from the fixed mold when the mold is opened. The cooling plate includes a first cooling mechanism therein, the first cooling mechanism cools the molding material in the cavity portion, and the cooling plate is detachably attached to an opposite-side surface of the movable mold from a surface to be in contact with the fixed mold.

A third aspect of the present disclosure provides a cassette mold for injection molding apparatus. The cassette mold includes: a fixed mold in which a gate into which a molding material flows is formed; a movable mold in which a cavity portion is formed and which is separated from the fixed mold when the mold is opened; and a first cooling plate which is detachably attached to an opposite-side surface of the movable mold from a surface to be in contact with the fixed mold and which is provided with a first cooling mechanism therein, and the first cooling mechanism cools the molding material in the cavity portion.

DESCRIPTION OF EXEMPLARY EMBODIMENTS

A. First Embodiment

Figure 1:
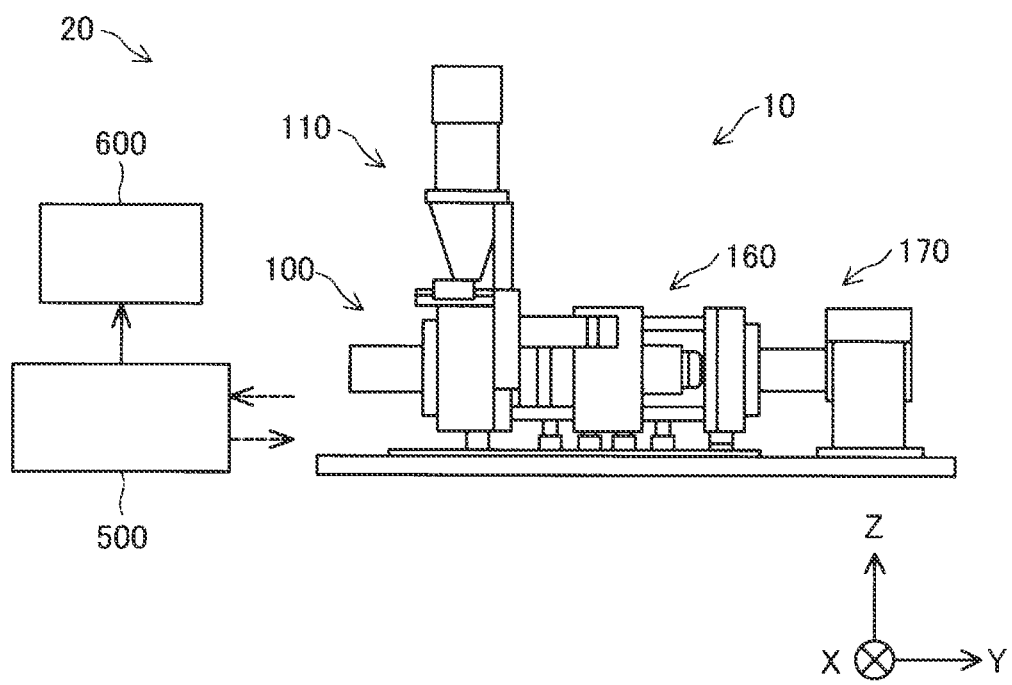
FIG. 1 is a diagram showing a schematic configuration of an injection molding apparatus.

FIG. 1 is a diagram showing a schematic configuration of an injection molding apparatus 10 according to the present embodiment. The injection molding apparatus 10 includes a plasticizing unit 100 that plasticizes a material, a material supply unit 110 that supplies the material to the plasticizing unit 100, a cassette mold 160 that is a cassette-type molding mold, a mold clamping device 170 that opens and closes the cassette mold 160, a control unit 500 and a display unit 600. The control unit 500 is a device that controls the plasticizing unit 100 or the mold clamping device 170, and is implemented by, for example, a computer, a programmable logic controller, or a combination thereof. The display unit 600 is coupled to the control unit 500, and is implemented by, for example, a liquid crystal display.

In FIG. 1, arrows along X, Y and Z directions orthogonal to one another are shown. The X, Y, and Z directions are directions along three spatial axes that are orthogonal to one another, that is, directions along the X axis, the Y axis, and the Z axis, and respectively include both one direction along the X axis, the Y axis, and the Z axis and an opposite direction. The X axis and the Y axis are axes along a horizontal plane, and the Z axis is an axis along a vertical line. In other figures, the arrows along the X, Y and Z directions are shown appropriately. The X, Y and Z directions in FIG. 1 and the X, Y and Z directions in the other figures indicate the same directions.

Figure 2:
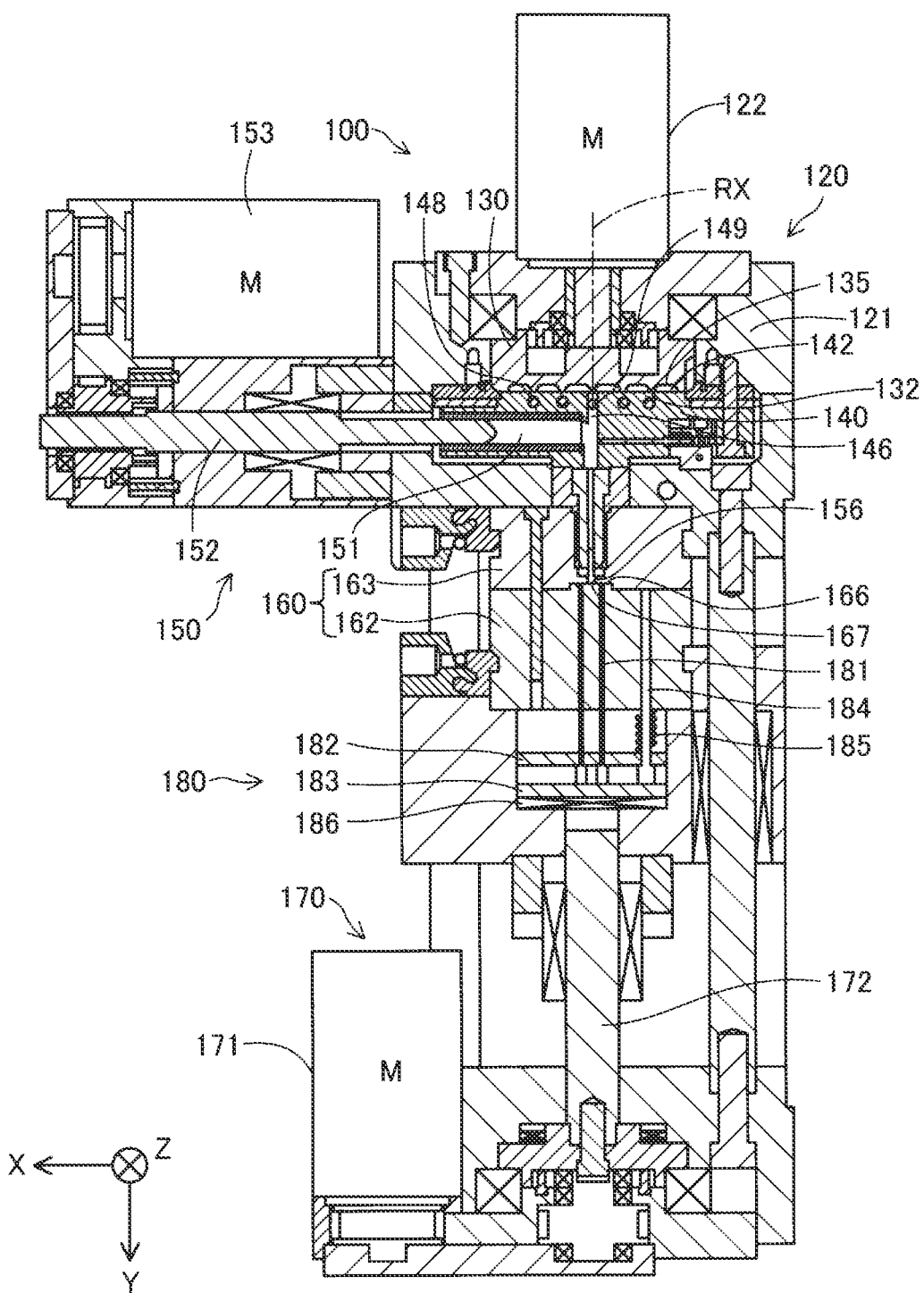
FIG. 2 is a cross-sectional view showing a schematic configuration of the injection molding apparatus.

FIG. 2 is a cross-sectional view showing a schematic configuration of the injection molding apparatus 10. FIG. 2 shows a cross section of the injection molding apparatus 10 viewed from a lower side of FIG. 1, that is, a -Z direction. As described above, the injection molding apparatus 10 includes the plasticizing unit 100 and the mold clamping device 170, and the cassette mold 160 is attached to the injection molding apparatus 10. FIG. 2 schematically shows a configuration of the cassette mold 160, and a detailed configuration thereof will be described later.

The plasticizing unit 100 includes a melting unit 120, an injection control unit 150, and a nozzle 156.

A melting unit 120 is in communication with the material supply unit 110 shown in FIG. 1. The material from the material supply unit 110 is supplied to the melting unit 120. In the present embodiment, the material supply unit 110 is implemented by a hopper. A material in a state of pellets, powder, or the like is accommodated in the material supply unit 110. In the present embodiment, as the material, a resin material such as an ABS resin formed in a pellet form is stored in the material supply unit 110.

The melting unit 120 includes a case 121, a drive motor 122, a rotor 130, a barrel 140, a heating unit 148, and a check valve 149. The melting unit 120 plasticizes at least a part of the material supplied from the material supply unit 110, and generates a molding material in a paste form having fluidity, and then guides the molding material to the injection control unit 150. A term "plasticize" means that a material having thermoplasticity is softened by being heated to a temperature equal to or higher than a glass transition point, and exhibits fluidity. A term "melt" means not only that the material having thermoplasticity is heated to a temperature equal to or higher than a melting point to be a liquid, but also the material having thermoplasticity is plasticized.

The rotor 130 has a substantially columnar shape whose height in a direction along a central axis RX thereof is smaller than a diameter. The rotor 130 is accommodated in a space surrounded by the case 121 and the barrel 140. The rotor 130 includes, on an end surface thereof facing the barrel 140, a groove forming surface 132 in which groove portions 135 are provided. The groove forming surface 132 of the rotor 130 faces a facing surface 142 of the barrel 140. The drive motor 122 is coupled to an opposite-side surface of the rotor 130 from the groove forming surface 132. The rotor 130 rotates around the central axis RX by torque generated by the drive motor 122. The drive motor 122 is driven under a control of the control unit 500. The central axis RX may be referred to as a rotation axis of the rotor 130.

Figure 3:
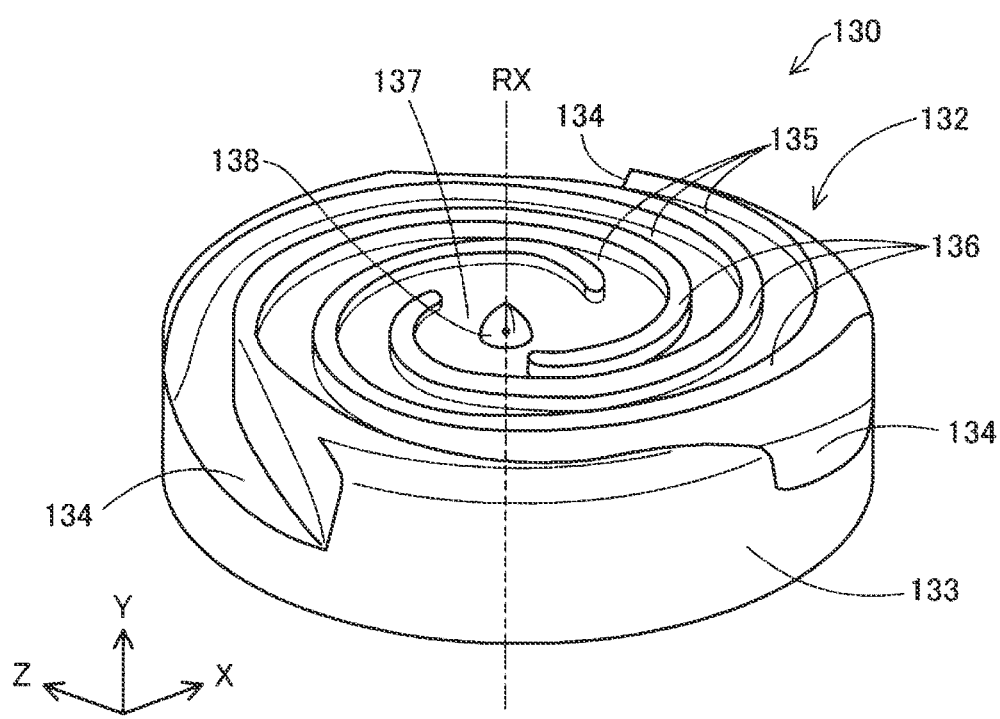
FIG. 3 is a perspective view showing a configuration of a rotor.

FIG. 3 is a perspective view showing a configuration of the rotor 130 on a groove forming surface 132 side. In FIG. 3, a position of the central axis RX of the rotor 130 is shown by a dashed line. As described above, the groove portions 135 are provided on the groove forming surface 132.

The groove portions 135 of the rotor 130 constitute a so-called scroll groove. The groove portion 135 extends from a central portion 137 toward an outer periphery of the rotor 130 in a swirl shape so as to draw an arc. The groove portion 135 may be configured to extend in an involute curve shape or a spiral shape. The groove forming surface 132 is provided with ridge portions 136 that form side wall portions of respective groove portions 135 and extend along the respective groove portions 135. The groove portion 135 is continuous to a material introduction port 134 provided on aside surface 133 of the rotor 130. The material introduction port 134 is a portion for receiving the material into the groove portion 135. The material supplied from the material supply unit 110 is supplied between the rotor 130 and the barrel 140 via the material introduction port 134.

The central portion 137 on the groove forming surface 132 of the rotor 130 is configured as a recess to which one end of the groove portion 135 is coupled. As shown in FIG. 2, the central portion 137 faces a communication hole 146 provided on the facing surface 142 of the barrel 140. The central portion 137 intersects the central axis RX.

The rotor 130 of the present embodiment includes, at the central portion 137, a retention reducing portion 138 protruding toward the communication hole 146. In the present embodiment, the retention reducing portion 138 has a substantially conical shape, and a central axis of the retention reducing portion 138 substantially coincides with the central axis RX of the rotor 130. A tip end of the retention reducing portion 138 is disposed inside the communication hole 146 rather than an opening end of the communication hole 146 on the facing surface 142. Since the molding material in the central portion 137 is efficiently guided to the communication hole 146 by the retention reducing portion 138, retention of the molding material is prevented.

FIG. 3 shows an example of the rotor 130 including three groove portions 135 and three ridge portions 136. The number of the groove portions 135 or the ridge portions 136 provided in the rotor 130 is not limited to three. The rotor 130 may be provided with only one groove portion 135, or may be provided with two or more groove portions 135. Any number of the ridge portions 136 may be provided in accordance with the number of the groove portions 135.

FIG. 3 illustrates an example of the rotor 130 in which material introduction ports 134 are formed at three places. The number of the material introduction ports 134 provided in the rotor 130 is not limited to three. In the rotor 130, the material introduction port 134 may be provided at only one place, or may be provided at two or more places. The rotor 130 can be referred to as a "flat screw" or a "scroll".

Figure 4:
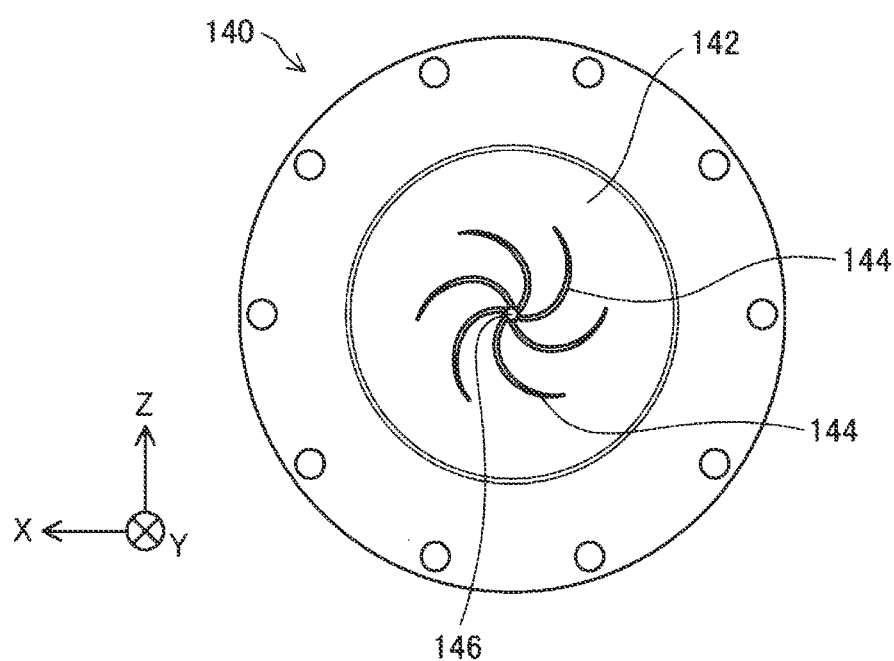
FIG. 4 is an explanatory diagram showing a configuration of a barrel.

FIG. 4 is an explanatory diagram showing a configuration of the barrel 140 on a facing surface 142 side. As described above, the barrel 140 includes the facing surface 142 facing the groove forming surface 132 of the rotor 130. The communication hole 146 in communication with the nozzle 156 is provided at a center of the facing surface 142. A plurality of guide grooves 144 are provided around the communication hole 146 in the facing surface 142. The guide groove 144 is coupled to the communication hole 146 at one end thereof, and extends in a swirl shape from the communication hole 146 toward the outer periphery of the facing surface 142. The guide groove 144 has a function of guiding a molding material to the communication hole 146. In order to make the molding material efficiently reach the communication hole 146, the guide groove 144 is preferably formed in the barrel 140, but the guide groove 144 may not be formed in the barrel 140.

The heating unit 148 shown in FIG. 2 heats the melting unit 120. In the present embodiment, the heating unit 148 is configured by four rod-shaped heaters provided in the barrel 140. The heating unit 148 is controlled by the control unit 500.

The melting unit 120 uses the rotor 130, the barrel 140, and the heating unit 148 to heat the material supplied between the rotor 130 and the barrel 140 while conveying the material toward the communication hole 146 and generate the plasticized molding material, and the molding material flows out from the communication hole 146 to the injection control unit 150.

The check valve 149 is provided in the communication hole 146. The check valve 149 prevents the molding material from flowing back to the central portion 137 or the groove portion 135 of the rotor 130 from the communication hole 146.

The injection control unit 150 includes a cylinder 151, a plunger 152, and a plunger drive unit 153. The cylinder 151 is a substantially cylindrical member coupled to the communication hole 146 of the barrel 140. The plunger 152 moves inside the cylinder 151. The plunger 152 is driven by the plunger drive unit 153 configured by a motor, a gear, or the like. The plunger drive unit 153 is controlled by the control unit 500.

The injection control unit 150 executes a metering operation and an injecting operation by the plunger 152 sliding in the cylinder 151 under the control of the control unit 500. The metering operation refers to an operation of guiding the molding material in the communication hole 146 into the cylinder 151 by moving the plunger 152 in a direction away from the communication hole 146, and metering the molding material in the cylinder 151. The injecting operation refers to an operation of injecting the molding material in the cylinder 151 into the molding mold via the nozzle 156 by moving the plunger 152 in a direction approaching the communication hole 146.

As described above, the nozzle 156 is in communication with the communication hole 146. When the above metering operation and injecting operation are executed, the molding material metered in the cylinder 151 is sent from the injection control unit 150 to the nozzle 156 via the communication hole 146.

The molding material sent to the nozzle 156 is injected from the nozzle 156 into a cavity portion 166 of the cassette mold 160. The cassette mold 160 includes a movable mold 162 and a fixed mold 163 that face each other, and has the cavity portion 166 between the movable mold 162 and the fixed mold 163. The cavity portion 166 is defined by an uneven shape formed on the movable mold 162 and the fixed mold 163. The cavity portion 166 has a space corresponding to a shape of a molded object. The molding material ejected from the nozzle 156 flows into a gate 167 formed in the fixed mold 163, and flows into the cavity portion 166 from the gate 167. A flow path that guides the molding material to the gate 167 is formed in the nozzle 156.

In the present embodiment, the movable mold 162 and the fixed mold 163 constituting the cassette mold 160 are made of a metal material. The "cassette mold 160" is a molding mold in which vertical and horizontal dimensions of outer shapes of the movable mold 162 and the fixed mold 163 are unified to a predetermined size, and is a relatively small mold that can be detachably attached to the injection molding apparatus 10. The vertical and horizontal dimensions include a vertical dimension and a horizontal dimension. The dimensions along the X direction in FIGS. 1 and 2 are the horizontal dimensions, and the dimensions along the Z direction are the vertical dimensions. The movable mold 162 and the fixed mold 163 may be formed of a ceramic material or a resin material without being limited to the metal.

The mold clamping device 170 includes a mold drive unit 171 and a ball screw 172. The mold drive unit 171 is configured by a motor, a gear, or the like, and is coupled to the movable mold 162 via the ball screw 172. Driving of the mold drive unit 171 is controlled by the control unit 500. The ball screw 172 transmits power generated by the driving of the mold drive unit 171 to the movable mold 162. Under the control of the control unit 500, the mold clamping device 170 moves the movable mold 162 using the mold drive unit 171 and the ball screw 172 so as to open the cassette mold 160, that is, performs an operation of separating the movable mold 162 from the fixed mold 163.

The injection molding apparatus 10 further includes an extrusion mechanism 180 for separating the molded object from the cassette mold 160. The extrusion mechanism 180 includes an ejector pin 181, a support plate 182, a support rod 184, a spring 185, an extrusion plate 183, and a thrust bearing 186.

The ejector pin 181 is a rod-shaped member for extruding the molded object molded in the cavity portion 166. The ejector pin 181 is provided so as to pass through the movable mold 162 and be inserted into the cavity portion 166. The support plate 182 is a plate member that supports the ejector pin 181. The ejector pin 181 is fixed to the support plate 182. The support rod 184 is fixed to the support plate 182 and is inserted into a through hole formed in the movable mold 162. The spring 185 is disposed in a space between the movable mold 162 and the support plate 182, and is inserted into the support rod 184. The spring 185 biases the support plate 182 such that a head portion of the ejector pin 181 forms a part of a wall surface of the cavity portion 166 during molding. The extrusion plate 183 is fixed to the support plate 182. The thrust bearing 186 is attached to the extrusion plate 183, and is provided such that a head portion of the ball screw 172 does not damage the extrusion plate 183. A thrust sliding bearing or the like may be used instead of the thrust bearing 186.

Figure 5:
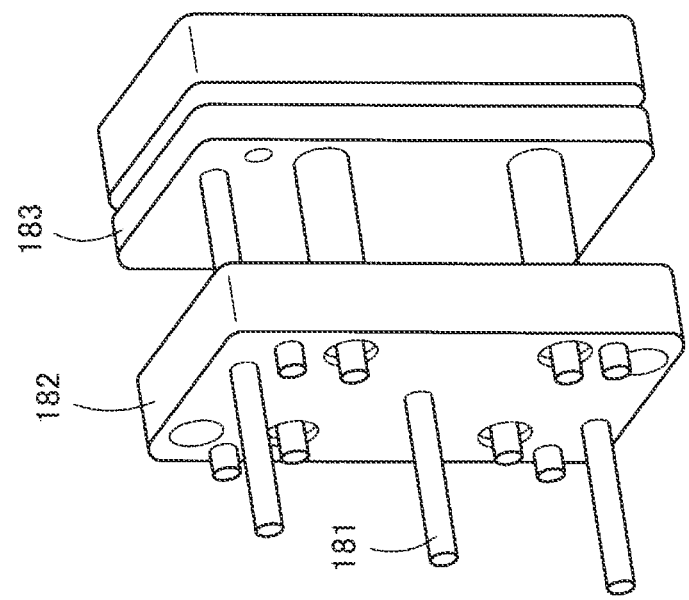
FIG. 5 is a perspective view showing a configuration of a cassette mold.
Figure 5:
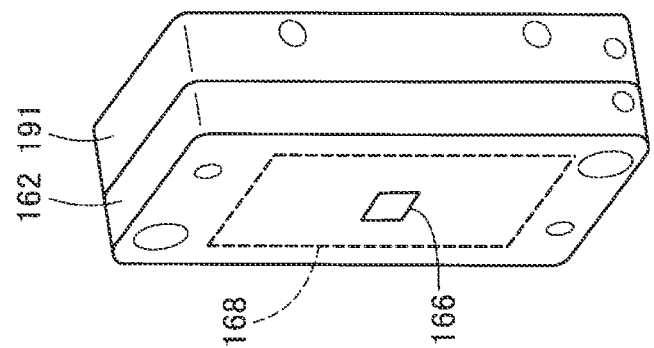
Figure 5:
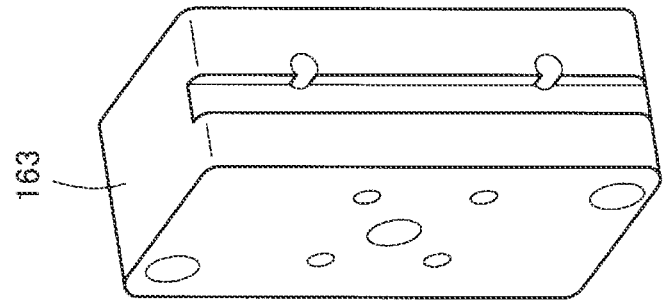

FIG. 5 is a perspective view showing a configuration of the cassette mold 160. As described above, the cassette mold 160 includes the fixed mold 163 and the movable mold 162. The movable mold 162 in the present embodiment includes, on an end surface on a fixed mold 163 side, a moldable region 168 in which the cavity portion 166 is formed. A cooling plate 191 is attached to an opposite side of the movable mold 162 from the fixed mold 163 side. The cooling plate 191 is detachably fixed to the movable mold 162 by a fastening member such as a bolt. Vertical and horizontal dimensions in an outer shape of the cooling plate 191 and the vertical and horizontal dimensions in the outer shape of the movable mold 162 are preferably unified, and in the present embodiment, the vertical and horizontal dimensions of the cooling plate 191 are the same as the vertical and horizontal dimensions of the movable mold 162.

Figure 6:
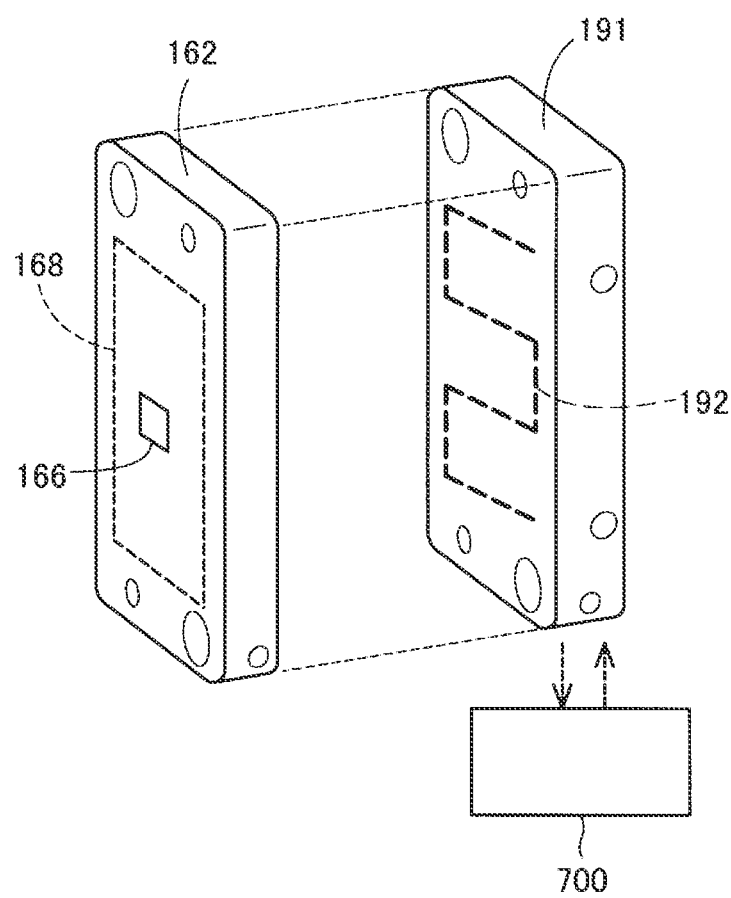
FIG. 6 is a perspective view showing a state in which a cooling plate is removed from a movable mold.

FIG. 6 is a perspective view showing a state in which the cooling plate 191 is detached from the movable mold 162. The cooling plate 191 is a plate including a cooling mechanism 192 therein. The cooling mechanism 192 is a mechanism for cooling the molding material in the cavity portion 166. As the cooling mechanism 192, the cooling plate 191 is provided with an internal flow path through which a heat medium such as water or oil flows. A temperature controller 700 is coupled to the internal flow path, and the heat medium adjusted to a desired temperature by the temperature controller 700 flows into the internal flow path. The cooling plate 191 is controlled to a predetermined temperature by the heat medium circulating between the temperature controller 700 and the internal flow path. The cooling plate 191 in the present embodiment corresponds to a "first cooling plate", and the cooling mechanism 192 corresponds to a "first cooling mechanism". The internal flow path constituting the cooling mechanism 192 is formed, for example, by three-dimensionally shaping the cooling plate 191. The internal flow path can also be formed, for example, by bonding two plates having recessed grooves on facing surfaces and forming the cooling plate 191.

In the present embodiment, a plurality of cooling plates 191 having different structures of the cooling mechanism 192 are prepared. An operator can select the cooling plate 191 including the cooling mechanism 192 corresponding to features of the cassette mold 160 from the plurality of cooling plates 191 and attach the cooling plate 191 to the movable mold 162. The "different structures of the cooling mechanism 192" means that, for example, a length or a diameter, an arrangement interval, an arrangement shape, or the like of the internal flow path are different.

Figure 7:
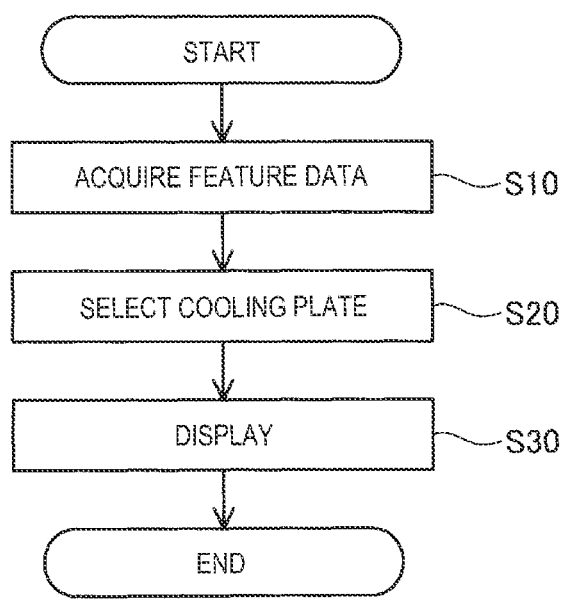
FIG. 7 is a flowchart of a cooling plate selection processing.

FIG. 7 is a flowchart of a cooling plate selection processing executed by the control unit 500. The cooling plate selection processing is a processing executed at an optional timing according to a start operation from the operator, and is a processing for assisting the operator in selecting the cooling plate 191.

First, in a first step S10, the control unit 500 acquires feature data representing the features of the cassette mold 160 that are used for molding the molded object. The feature data includes, for example, at least a part of data representing a size of the cavity portion 166, a type of the molding material, molding accuracy, and cycle time required for molding. The feature data may be input by the operator using an input device such as a keyboard, or may be acquired through a network or a recording medium. The size of the cavity portion 166 includes values such as a volume, a maximum vertical dimension, a maximum horizontal dimension, and a maximum thickness of the cavity portion 166.

In a second step S20, the control unit 500 selects, from the plurality of cooling plates 191 prepared in advance, the cooling plate 191 corresponding to the feature data acquired in the first step S10. The control unit 500 can select the cooling plate 191 by referring to, for example, a table in which a correspondence between the feature data and the cooling plate 191 is defined in advance. In the second step S20, for example, when the size of the cavity portion 166 is large, the cooling plate 191 with a long internal flow path is selected, and when the cycle time is short, the cooling plate 191 having the internal flow path with a large diameter is selected. The correspondence between the feature data and the cooling plate 191 can be defined by evaluating, by a simulation or an experiment, a combination that can satisfy required molding accuracy or cycle time. In addition, the control unit 500 may select the cooling plate 191 by learning the correspondence between the feature data and the cooling plate 191 using machine learning and referring to the learned data. An algorithm used for the machine learning is not particularly limited, and learning algorithms known as the machine learning such as supervised learning, unsupervised learning, reinforcement learning, and neural networks can be adopted.

In a third step S30, the control unit 500 displays, on the display unit 600, information indicating the cooling plate 191 selected in the second step S20. The control unit 500 can present the selected cooling plate 191 to the operator by displaying information such as an identification number or an identification symbol of the selected cooling plate 191 and an image representing the cooling plate 191 on the display unit 600. The operator attaches the cooling plate 191 presented in this way to the movable mold 162 of the cassette mold 160, and attaches the cassette mold 160 to the injection molding apparatus 10.

According to the injection molding apparatus 10 of the present embodiment described above, the cooling plate 191 including the cooling mechanism 192 therein is attached to the movable mold 162, and the cooling mechanism 192 cools the molding material in the cavity portion 166. As described above, in the present embodiment, since the cooling plate 191 is attached to the movable mold 162, it is not necessary to form the cooling mechanism 192 in the molding mold. Therefore, the moldable region 168 in which the cavity portion 166 is formed can be expanded. As a result, limitation of the degree of freedom in designing the cavity portion 166 is reduced due to the arrangement of the cooling mechanism 192. Further, since it is not necessary to design the cooling mechanism 192 exclusively for every molding mold, the versatility of the molding mold can be enhanced. Further, it is not necessary to embed the cooling mechanism in the movable mold, which facilitates adding of an additional mechanism such as a slide mechanism to the molding mold. Further, since the arrangement of the cooling mechanism 192 with respect to the cooling plate 191 is not affected by the cavity portion 166, the degree of freedom in designing the cooling mechanism 192 can be increased.

Further, the injection molding apparatus 10 of the present embodiment can select the cooling plate 191 corresponding to the features of the molding mold from the plurality of cooling plates 191 and present the cooling plate 191 to the operator. Therefore, convenience for the operator can be enhanced.

B. Second Embodiment

Figure 8:
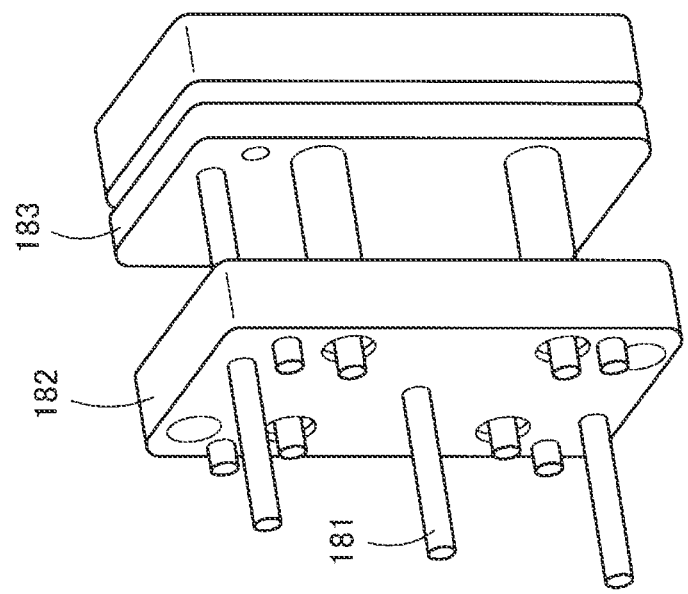
FIG. 8 is a perspective view showing a configuration of a cassette mold according to a second embodiment.
Figure 8:
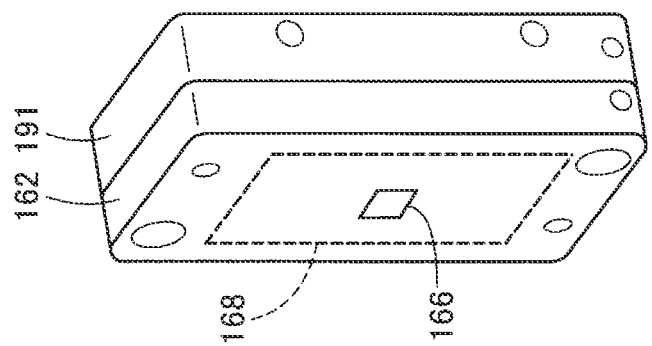
Figure 8:
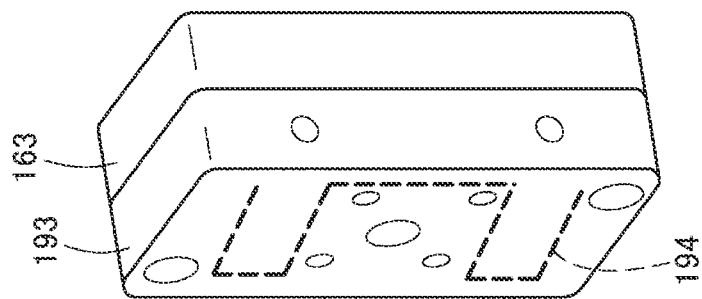

FIG. 8 is a perspective view showing the configuration of the cassette mold 160 according to a second embodiment. In the present embodiment, a first cooling plate 191 is attached to the movable mold 162 as in the first embodiment, and further a second cooling plate 193 is attached to the fixed mold 163. The second cooling plate 193 is detachably attached to an opposite-side surface of the fixed mold 163 from a surface on a movable mold 162 side. The second cooling plate 193 includes a second cooling mechanism 194 therein, and the second cooling mechanism 194 cools the molding material in the cavity portion 166. The second cooling mechanism 194 includes an internal flow path, and as in the first embodiment, a temperature controller is coupled to the internal flow path, and a heat medium whose temperature is adjusted by the temperature controller flows into the internal flow path. In the present embodiment, vertical and horizontal dimensions of the second cooling plate 193 are the same as the vertical and horizontal dimensions of the fixed mold 163.

According to the second embodiment, a temperature of the molding material in the cavity portion 166 can be adjusted not only by using the first cooling plate 191 but also by using the second cooling plate 193. Further, since it is not necessary to form a cooling mechanism in the fixed mold 163, it is possible to reduce a limitation of the degree of freedom in designing the cavity portion 166 formed in the fixed mold 163.

Similar to the first cooling plate 191, the second cooling plate 193 corresponding to the features of the cassette mold 160 may be selected from a plurality of second cooling plates 193 by the cooling plate selection processing shown in FIG. 8.

C. Other Embodiments

C-1. Execution of the cooling plate selection processing in the above embodiment is not essential, and the operator may select the cooling plate by himself or herself without executing the cooling plate selection processing. Further, a plurality of types of cooling plates may not be prepared.

C-2. The injection molding apparatus 10 in the above embodiment can use molding molds having various dimensions without being limited to the cassette mold 160. The vertical and horizontal dimensions of the movable mold 162 and the cooling plate 191 and the vertical and horizontal dimensions of the fixed mold 163 and the second cooling plate 193 may be different from each other.

C-3. The plasticizing unit 100 in the above embodiment plasticizes the material by using the rotor 130 including, on the end surface thereof, the groove portion 135. In contrast, the plasticizing unit 100 may plasticize the material using a spiral in-line screw accommodated in a cylindrical barrel.

C-4. In the above embodiment, the temperature controller 700 is used to control the temperature of the cooling plate 191. In this temperature control, the control unit 500 may control the temperature controller 700 by using, for example, a temperature sensor attached to the cassette mold 160. For example, when a measurement temperature measured by using the temperature sensor is significantly lower than a set temperature, the control unit 500 raises the temperature of the cassette mold 160 by controlling the temperature controller 700 and raising the temperature of the heat medium to a temperature equal to or higher than the set temperature. Then, when a temperature near the set temperature is measured, the control unit 500 returns the temperature of the heat medium to the set temperature, and stabilizes the temperature of the cassette mold 160. By performing such a temperature control, the control unit 500 can shorten temperature rising time of the cassette mold 160.

D. Other Aspects

The present disclosure is not limited to the embodiments described above, and may be implemented by various configurations without departing from the scope of the present disclosure. For example, in order to solve some or all of problems described above, or to achieve some or all of effects described above, technical features in the embodiments corresponding to technical features in aspects to be described below can be replaced or combined as appropriate. If not being described as essential in the present description, the technical features can be deleted as appropriate.

1. A first aspect of the present disclosure provides an injection molding apparatus. The injection molding apparatus includes: a molding mold including a fixed mold in which a gate into which a molding material flows is formed, and a movable mold in which a cavity portion is formed and which is separated from the fixed mold when the mold is opened; a nozzle in which a flow path that guides the molding material to the gate is formed; and a first cooling plate which is detachably attached to an opposite-side surface of the movable mold from a surface to be in contact with the fixed mold and which is provided with a first cooling mechanism therein, and the first cooling mechanism cools the molding material in the cavity portion.

In the injection molding apparatus of this aspect, since the first cooling plate is attached to the movable mold, it is not necessary to form a cooling mechanism in the molding mold. Therefore, it is possible to reduce a limitation of the degree of freedom in designing the cavity portion formed in the movable mold. Further, since it is not necessary to design the cooling mechanism exclusively for every molding mold, the versatility of the molding mold can be enhanced.

2. In the above aspect, the injection molding apparatus may include a second cooling plate which is detachably attached to an opposite-side surface of the fixed mold from a surface to be in contact with the movable mold and which is provided with a second cooling mechanism therein, and the second cooling mechanism cools the molding material in the cavity portion. According to such an aspect, the temperature of the molding material in the cavity portion 166 can be adjusted not only by using the first cooling plate but also by using the second cooling plate. Further, since it is not necessary to form a cooling mechanism in the fixed mold, it is possible to reduce a limitation of the degree of freedom in designing the cavity portion formed in the fixed mold.

3. In the above aspect, the injection molding apparatus may include a control unit that acquires feature data representing a feature of the molding mold and selects a cooling plate corresponding to the feature data as the first cooling plate from a plurality of types of cooling plates having different cooling mechanism structures. According to such an aspect, the cooling plate corresponding to the feature of the molding mold can be easily selected from the plurality of cooling plates.

4. In the above aspect, the feature data may include data representing a size of the cavity portion, a type of the molding material, molding accuracy, or cycle time.

5. In the above aspect, the injection molding apparatus may include a display unit that displays information indicating the cooling plate selected by the control unit.

6. In the above aspect, vertical and horizontal dimensions in an outer shape of the first cooling plate and vertical and horizontal dimensions in an outer shape of the movable mold may be unified.

7. A second aspect of the present disclosure provides a cooling plate for injection molding apparatus, and the injection molding apparatus includes: a fixed mold in which a gate into which a molding material flows is formed, and a movable mold in which a cavity portion is formed and which is separated from the fixed mold when the mold is opened. The cooling plate includes a first cooling mechanism therein, the first cooling mechanism cools the molding material in the cavity portion, and the cooling plate is detachably attached to an opposite-side surface of the movable mold from a surface to be in contact with the fixed mold.

8. A third aspect of the present disclosure provides a cassette mold for injection molding apparatus. The cassette mold includes: a fixed mold in which a gate into which a molding material flows is formed; a movable mold in which a cavity portion is formed and which is separated from the fixed mold when the mold is opened; and a first cooling plate which is detachably attached to an opposite-side surface of the movable mold from a surface to be in contact with the fixed mold and which is provided with a first cooling mechanism therein, and the first cooling mechanism cools the molding material in the cavity portion.

What is claimed is:

1. An injection molding apparatus, comprising:
   a molding mold including a fixed mold in which a gate into which a molding material flows is formed, and a movable mold in which a cavity portion is formed and which is separated from the fixed mold when the molding mold is opened;
   a nozzle in which a flow path that guides the molding material to the gate is formed;
   a first cooling plate which is detachably attached to an opposite-side surface of the movable mold from a surface to be in contact with the fixed mold and which is provided with a first cooling mechanism therein, wherein the first cooling mechanism cools the molding material in the cavity portion;
   an extrusion mechanism that comprises an ejector pin, a support plate which is a plate-like member that supports the ejector pin, a support rod, and a spring, wherein
      the ejector pin passes through the movable mold for insertion into the cavity portion,
      the movable mold comprises a first through hole for insertion of the support rod,
      the spring is inserted around the support rod, and the first cooling plate is between the support plate and the movable mold; and a control unit configured to:

acquire feature data that includes a type of the molding material, molding accuracy, and cycle time associated with a molding process of the molding material; and select, based on the acquired feature data, the first cooling plate from a plurality of first cooling plates, wherein the selection is based on a machine learning model that is trained with a correspondence between the plurality of first cooling plates and the feature data.

2. The injection molding apparatus according to claim 1, further comprising a second cooling plate which is detachably attached to an opposite-side surface of the fixed mold from a surface to be in contact with the movable mold and which is provided with a second cooling mechanism therein, the second cooling mechanism cooling the molding material in the cavity portion.

3. The injection molding apparatus according to claim 1, wherein the feature data further includes data representing a size of the cavity portion.

4. The injection molding apparatus according to claim 1, further comprising a display unit that displays information indicating the first cooling plate selected by the control unit.

5. The injection molding apparatus according to claim 1, wherein vertical and horizontal dimensions in an outer shape of the first cooling plate and vertical and horizontal dimensions in an outer shape of the movable mold are unified.

6. The injection molding apparatus according to claim 1, wherein the spring is inserted around the support rod and is between the movable mold and the support plate, the spring biases the support plate such that a head portion of the ejector pin is a part of a wall surface of the cavity portion during molding, the extrusion mechanism further comprises an extrusion plate that is fixed to the support plate, and the extrusion plate includes a thrust bearing.

7. The injection molding apparatus according to claim 1, wherein the first cooling plate comprises a second through hole for insertion of the support rod.

8. The injection molding apparatus according to claim 1, further comprising a temperature controller, wherein the first cooling plate includes an internal flow path through which a heat medium flows, the temperature controller is coupled to the internal flow path of the first cooling plate to enable the heat medium to circulate between the internal flow path and the temperature controller, and the temperature controller is configured to control a temperature of the heat medium.

9. The injection molding apparatus according to claim 1, further comprising a melting unit that includes a rotor, wherein a rotation axis of the rotor coincides with each of a central axis of the cavity portion and a central axis of the ejector pin.

* * * * *